UNITED STATES PATENT OFFICE.

JAMES OTIS HANDY, OF PITTSBURG, PENNSYLVANIA.

PROCESS OF TREATING VANADIUM ORES.

No. 831,280.      Specification of Letters Patent.      Patented Sept. 18, 1906.

Application filed June 2, 1906. Serial No. 319,958.

*To all whom it may concern:*

Be it known that I, JAMES OTIS HANDY, a citizen of the United States, residing in Pittsburg, county of Allegheny, and State of Pennsylvania, have invented certain new and useful Improvements in Processes of Treating Vanadium Ores; and I do hereby declare the following to be a full, clear, and exact description of the invention, such as will enable others skilled in the art to which it appertains to practice and use the same.

This invention relates to processes of treating vanadium ores; and it consists in a method of recovering valuable constituents from vanadium ores, and particularly the sulfureted ores, in the form of useful products, all as more fully hereinafter set forth, matters of novelty being particularly pointed out in the appended claims.

Sulfureted ores of vanadium frequently contain considerable sulfur, which must be removed before extraction of the vanadium, while the amount is often great enough to render its recovery desirable. In a sample of one such ore analysis showed approximately thirty per cent. of free sulfur, forty per cent. of vanadium sulfid, and thirty per cent. of silicious gangue. From such an ore by the hereinafter-recited method may be extracted products corresponding to some twenty-seven per cent. of vanadium pentoxid or some fifteen per cent. of vanadium.

It is the object of the present invention to treat ores of this and like character by a simple, cheap, and ready method, enabling both the recovery of the vanadium and of the sulfur, certain details of the method also being applicable to vanadium ores generally.

Experiment has shown me that compounds of vanadium contained in ores are readily converted into pentoxid upon roasting such ores with access of air, especially in the presence of a body capable of forming a vanadate. If this body be a sodium or potassium compound and proper precautions be used in the treatment, vanadates may be formed exhibiting peculiar relations in regard to their solubility in water. Advantage may be taken of these properties to prepare merchantable vanadium compounds by a very simple and direct process. Sodium compounds are preferable to those of potassium for this purpose, being cheaper, of lower molecular weight, and hence giving less bulky masses for treatment, and possessing solubilities more advantageous. However, potassium compounds may be used. The sodium or potassium may be used in the form of any of a number of their compounds, vanadium pentoxid being strongly acid in its nature and readily expelling more volatile acids in roasting. Of the numerous sodium salts of vanadic acid the pyrovanadate is preferable for the present purposes, and it is therefore in general desirable to use the correct amount of a sodium compound to form it—about four atoms of sodium in whatever salt be employed to every molecule of vanadium pentoxid.

Although any sodium salt with a displaceable acid—such as sulfate, carbonate, &c., or even the hydrate—may be employed, the chlorid is believed to be the best adapted, since at the ordinary roasting temperatures suitable for forming vanadium pentoxid it does not readily render soluble other substances—such as silica, alumina, &c.—and hence comparatively pure solutions may be obtained by directly leaching salt-roasted ore. Vanadic oxids have a specific oxidizing influence upon chlorids at roasting temperature in the presence of air, acting as carriers of oxygen, and therefore readily convert sodium or potassium chlorid into vanadates, the liberated chlorin escaping as such or as HCl. The temperature at which this reaction takes place is too low to permit reaction of the chlorid with other constituents of the ore. In using a method based upon this fact it is of course necessary to remove the sulfur before attempting to oxidize the vanadium in the described manner, and it is desirable to combine such removal with the recovery of the sulfur in ores of the class described. For this purpose the ore is preferably first freed of the free sulfur by distillation in a current of any neutral gas—such as products of combustion, producer-gas, lighting-gas, &c.—the distilled sulfur being condensed in any of the well-known devices for this purpose. A further portion of sulfur may be regained and added to that first obtained by careful heating with restricted access of air. The ore is then roasted to remove the remaining sulfur, the sulfur dioxid formed being available for use in a later step of the process. Where any use exists for sulfur in the form of dioxid, of course all the sulfur may be removed in that form and the ore directly sweet-roasted; but with ores of the character described the sulfur is so readily available and in general so pure—the ores being frequently free of arsenic—that it is usually desirable to distil it off in the free form.

The removal of the sulfur may be effected while the ore is in lump form; but it is preferable to pulverize it first as enabling an evener action and more uniform product. The salt or sulfate of sodium, if either of these salts be used, may be directly admixed with the ore during pulverization, as it serves a good purpose in the sulfur-expulsion operation in keeping the mass of ore open and unsintered, while remaining inert chemically. In the presence of salt, however, the temperature during sulfur expulsion is preferably kept rather low and as much sulfur as possible driven off as such prior to permitting access of air. The salt, &c., may, however, be admixed after the sulfur expulsion. If carbonate or hydrate of sodium be used, the subsequent mixing is better. The amount of salt or other sodium compound is best as previously indicated—not much more than enough to furnish four atoms of sodium for each molecule of vanadium pentoxid. For each pound or part of vanadium pentoxid resulting from the roasting there may be used a pound and a quarter or a part and a quarter of common salt or a corresponding amount of other sodium or potassium salt. In the case of ores containing lead or silver very near the exact amount should be used. Lead chlorid, if formed by an excess of salt, would exercise a detrimental influence later. With ores free of lead a slight excess is rather desirable for reasons later appearing. The mixture of sulfur-free ore and salt is next roasted with free access of air until the color indicates that the oxidation and conversion into vanadate is complete.

The roasted mixture is extracted with hot water, using as little as may be necessary for complete solution of the pyrovanadate. The concentrated solution so formed is nearly pure sodium pyrovanadate, containing, if the described operations are carefully performed, little other dissolved matter except the excess of salt, if such an excess were used. Its purity may be heightened by previously washing the roasted ore with cold water, in which the pyrovanadate is little soluble. In the hot-water extraction methodical leaching, passing the same portion of hot water over successive portions of the roasted ore, is advisable. Washings are used for extracting fresh material. The hot-water solution so formed may be treated in a number of ways for the formation of merchantable or useful products. On evaporation to dryness sodium pyrovanadate is left in a purity sufficient for commercial purposes, its purity being greater if the roasted ore was first extracted with cold water, as described. Its purity may also be increased by rapidly extracting the residue after evaporation with cold water, which removes excess of common salt and other impurities, leaving behind the pyrovanadate in the form of a commercially pure salt. The presence of the excess of common salt, previously mentioned, is here advantageous, as heightening the insolubility of the pyrovanadate. These differential solubilities of the pyrovanadate in hot and cold water and the ready formation of the pyrovanadate by salt-roasting render the above a very suitable method for directly producing a merchantable vanadium compound from any ore, whether sulfureted or not. Vanadate of lead and vanadate of zinc, both common constituents of vanadium ores, yield readily to this treatment; but in the presence of the former it is desirable to use very little or no excess of salt to prevent the formation of lead chlorid in the leaching, this salt also being soluble in hot water and insoluble in cold. Practically the same result may be accomplished in another way, also yielding a pure vanadium compound suitable for various purposes. If before evaporating to dryness the solution of the pyrovanadate be decomposed by acidulation with enough of any strong acid to correspond to its sodium, the residue will also be practically pure and may be treated with cold water in the way described to remove excess of salt redissolved in hot water, &c. During evaporation and during cooling much of the vanadic oxid generally crystallizes out. The nature of the oxid depends upon the particular acid used; but it is generally a mixture of the pentoxid with more or less of the lower oxids. For the acid may be used the sulfur dioxid evolved in sulfur expulsion, the chlorin or hydrochloric acid expelled in the salt-roasting, or any convenient acid, such as sulfuric or hydrochloric. The vanadic oxid so formed is quite as pure as the pyrovanadate, but of course is somewhat richer in vanadium, and therefore more desirable for many purposes, particularly for furnacing to form ferrovanadium, though the sodium vanadate may also be used for this purpose. When a particularly pure article free from traces of silica, &c., is desired, both treatments may be combined, the sodium pyrovanadate, formed as first described being redissolved, acidulated, and the solution evaporated to dryness.

Such vanadium as is dissolved by the cold water in the extractions described may be recovered by acidulating and evaporating to dryness, &c.

For certain purposes the hot-water solution of sodium pyrovanadate may be precipitated by various reagents to obtain products useful for making ferrovanadium, &c. Ferrous sulfate yields a mixture of vanadium and iron oxids suitable for this purpose. Lime or baryta also yield precipitates suitable. These precipitates, as well as the sodium pyrovanadate, the vanadic oxids, or the iron mixture, may all be used for the production of ferrovanadium by mixing with iron oxid or metallic iron and reducing in the electric furnace or in a blast-furnace. For such purposes the vanadic oxid obtained by the described double treatment is very suitable as being free of silica. The sodium pyrovanadate is amenable to treatment in the furnace without removing the adhering sodium chlorid.

To recapitulate, my process in its present preferred form consists in treating ores of the class described by pulverizing the same with about the proportion of salt specified, expelling and recovering free sulfur by distillation, recovering a further portion of sulfur by limited oxidation, raising the temperature and permitting access of air to burn off residual sulfur, still further raising the temperature to oxidize the vanadium and convert it into sodium vanadate, leaching the roasted material with a limited quantity of hot water to obtain a concentrated solution, evaporating this solution to dryness, extracting the residue from the evaporation to remove impurities and leave a substantially pure vanadate, recovering dissolved vanadium as described, redissolving the vanadate in hot water, acidulating, once more evaporating, and extracting with cold water. The several steps of this preferred method, however, are all singly useful, and they may be combined in other ways than that here indicated. I regard my process as particularly applicable to the production of pure concentrated vanadium products from any ore, sulfureted or not.

What I claim is—

1. The process of treating sulfureted vanadium ores which consists in distilling and removing the sulfur from the ore, roasting the treated ore in admixture with a salt of an alkali metal, and extracting the roasted ore with water.

2. The process of treating sulfureted vanadium ores which consists in distilling and removing the sulfur from the ore, roasting the treated ore in admixture with sodium chlorid and extracting the roasted ore with water.

3. The process of treating sulfureted vanadium ores which consists in distilling and removing the sulfur from the ore, roasting the treated ore in admixture with sodium chlorid, extracting the roasted ore with hot water and evaporating the extract to dryness.

4. The process of treating sulfureted vanadium ores which consists in distilling and removing the sulfur from the ore, roasting the treated ore in admixture with sodium chlorid, extracting the roasted ore with hot water, evaporating the extract to dryness and washing the residue with cold water.

5. The process of treating sulfureted vanadium ores which consists in pulverizing said ores, mixing with sodium chlorid, heating to distil off sulfur, burning off residual sulfur, roasting to convert the vanadium into sodium vanadate and extracting with water.

6. The process of treating sulfureted vanadium ores which consists in pulverizing said ores, mixing with sodium chlorid, heating to distil off sulfur, burning off residual sulfur, roasting to convert the vanadium into sodium vanadate, extracting the roasted material with hot water, and evaporating the solution to dryness.

7. The process of treating sulfureted vanadium ores which consists in pulverizing said ores, mixing with sodium chlorid, heating to distil off sulfur, burning off residual sulfur, roasting to convert the vanadium into sodium vanadate, extracting the roasted material with hot water, evaporating the extract to dryness and extracting with cold water.

8. The process of treating sulfureted vanadium ores which consists in pulverizing said ores, mixing with sodium chlorid, heating to distil off sulfur, burning off residual sulfur, roasting to convert the vanadium into sodium vanadate, extracting the roasted material with hot water, evaporating the extract to dryness, extracting with cold water, and redissolving the residue in hot water.

9. The process of treating sulfureted vanadium ores which consists in pulverizing said ores, mixing with sodium chlorid, heating to distil off sulfur, burning off residual sulfur, roasting to convert vanadium into sodium vanadate, extracting the roasted material with hot water, evaporating the extract to dryness, extracting with cold water, redissolving the residue in hot water, acidulating and reëvaporating to dryness.

10. The process of treating sulfureted vanadium ores which consists in pulverizing the same with a quantity of sodium chlorid sufficient to form sodium pyrovanadate with contained vanadium, expelling and recovering sulfur, roasting to form such pyrovanadate, extracting with hot water and evaporating the solution to dryness.

11. The process of perparing high-grade vanadium products from vanadium ores which consists in roasting such ores with the proper quantity of alkaline salts to form pyrovanadate, extracting the roasted ore with hot water and evaporating the solution to dryness.

12. The process of preparing high-grade vanadium products from vanadium ores which consists in roasting such ores admixed with sodium chlorid, evaporating the solution to dryness and extracting the residue with cold water.

13. The process of preparing high-grade vanadium products from vanadium ores which consists in roasting such ores with the proper quantity of a sodium compound to form sodium pyrovanadate from contained vanadium, extracting the roasted ore with hot water and evaporating the solution to dryness.

14. The process of preparing high-grade vanadium products from vanadium ores which consists in roasting such ores with a sodium compound, extracting the roasted ore with hot water, evaporating the solution to dryness and extracting with cold water.

15. The process of preparing high-grade vanadium products from vanadium ores which consists in roasting such ores with a sodium compound, extracting the roasted ore with hot water, evaporating the solution to dryness, extracting with cold water, and redissolving the residue in hot water.

16. The process of preparing high-grade vanadium products from vanadium ores which consists in roasting such ores with a sodium compound, extracting the roasted ore with hot water, evaporating the solution to dryness, extracting with cold water, redissolving in hot water, acidulating and reëvaporating to dryness.

17. The process of preparing a high-grade vanadium product which consists in acidulating a solution of a crude vanadate of an alkali metal with sufficient acid to saturate the bases present, evaporating and purifying separated solids by extraction of the same with cold water.

18. The process of preparing a high-grade vanadium product which consists in acidulating a solution of a crude vanadate of an alkali metal with sufficient acid to saturate bases present, evaporating to dryness and extracting the residue with cold water.

19. The process of preparing a high-grade vanadium product which consists in roasting a vanadium ore with an alkali compound to form a vanadate, preparing a solution of such vanadate, acidulating the solution, evaporating and purifying separated solids by washing the same with cold water.

20. The process of preparing a high-grade vanadium product which consists in roasting a vanadium ore with salt to form a sodium vanadate, preparing a solution of such vanadate, acidulating the solution, evaporating and purifying separated solids by washing the same with cold water.

In testimony whereof I affix my signature in the presence of two subscribing witnesses.

JAMES OTIS HANDY.

Witnesses:
FOSTER HEWETT,
JOHN M. BAILEY.